Inventor
Horst Schulz
Julian Schachner
Attorney

3,246,701
HYDRAULIC POSITION AND DRAFT CONTROL WITH ELECTRONIC SENSING

Horst Schulz, Stossdorf uber Siegburg, Germany, assignor to International Harvester Company, Chicago, Ill., a corporation of New Jersey
Filed Nov. 13, 1963, Ser. No. 323,485
Claims priority, application Germany, Nov. 20, 1962, J 22,692
4 Claims. (Cl. 172—9)

The invention relates to an automatic position and draft control system for vehicles such as farm tractors with electronically operated sensing and hydraulic control means.

Position and draft control systems of the known type are controlled with regard to working depth or lifting height and draft by means of a control valve built into the hydraulic system, the valve being purely mechanically supplied with the control quantities "position" and "draft" by an outer lever linkage in cases of pre-selection as well as automatic re-adjustment. The frictional losses caused in the lever linkage considerably reduce the effective sensitivity and regulation of the automatic control device. The separation of position and draft control is conventionally effected in such a way that of the two operating levers that rest on the one surface of a pre-stressed control piston, one lever has to be removed from the piston if the whole lifting range and/or a complete draft control is to be available.

An absolutely leakproof crossing of the control edges to avoid throttling and leakage losses requires additional measures, e.g. an auxiliary piston connected to the control piston. This would render the control device more expensive. A modification of the sensitivity in case of draft control is presently effected according to the lever ratio by inserting the upper link into different bores of an elastic intermediate member that acts on the control piston. However, this adversely affects the kinematic conditions when lifting the mounted implement.

This invention therefore endeavors to create a simple kinematically favorable and safely functioning hydraulic position and draft control system, with which the control quantities "position" and "draft" are converted into electric quantities, and transmitted without great losses to the control unit that is provided with a solenoid spool, for example. Sensitivity and attenuation are quite easily governed, and adapted to the individual ground conditions. The control device is applicable for 3-point and 2-point suspension hitch as well as for front loader linkages. According to the invention this problem is solved in such a way that the solenoid spool which controls the hydraulic circuit receives the control pulses for the position control in a separate or combined manner from variable resistors or slide rheostats that are connected with parts of the lifting linkage or with ground clearance feelers. The control pulses for draft control are received from draft-change responsive strain gages, capacitively or inductively acting transducers. The direction of deviation from a pre-selected position and/or draft quantity is determined by a phase detector or polarity comparison system and the control response time is adjusted by a time element. The control quantity "draft" is measured on those parts of the lifting linkage that are under compressive or tensile stresses, preferably in bores of links of a 3-point suspension hitch, or front loader linkage. When using strain gages in the lower links of a 3-point linkage, that are under bending stress, particularly during lifting action, the strain gages are arranged in such a way and connected in a bridge that the variations of their electric resistance neutralize each other in bending.

A separation of position and draft control as well as a superposition of both controls is accomplished by means of a mixing control connected behind the bridge balancing rheostats; on the tapping point of said mixing control the efficiency of the one or the other bridge can be varied.

In order to prevent short-time load peaks from effecting a control action, a time element is provided that prevents control of the solenoid spool unless the loading of the mounted implement exceeds a permissible period. Further details of the invention are more thoroughly explained in the drawing by means of an embodiment in which:

FIG. 3 is a schematic representation for the arrangement of the strain gages.

Figure 1:
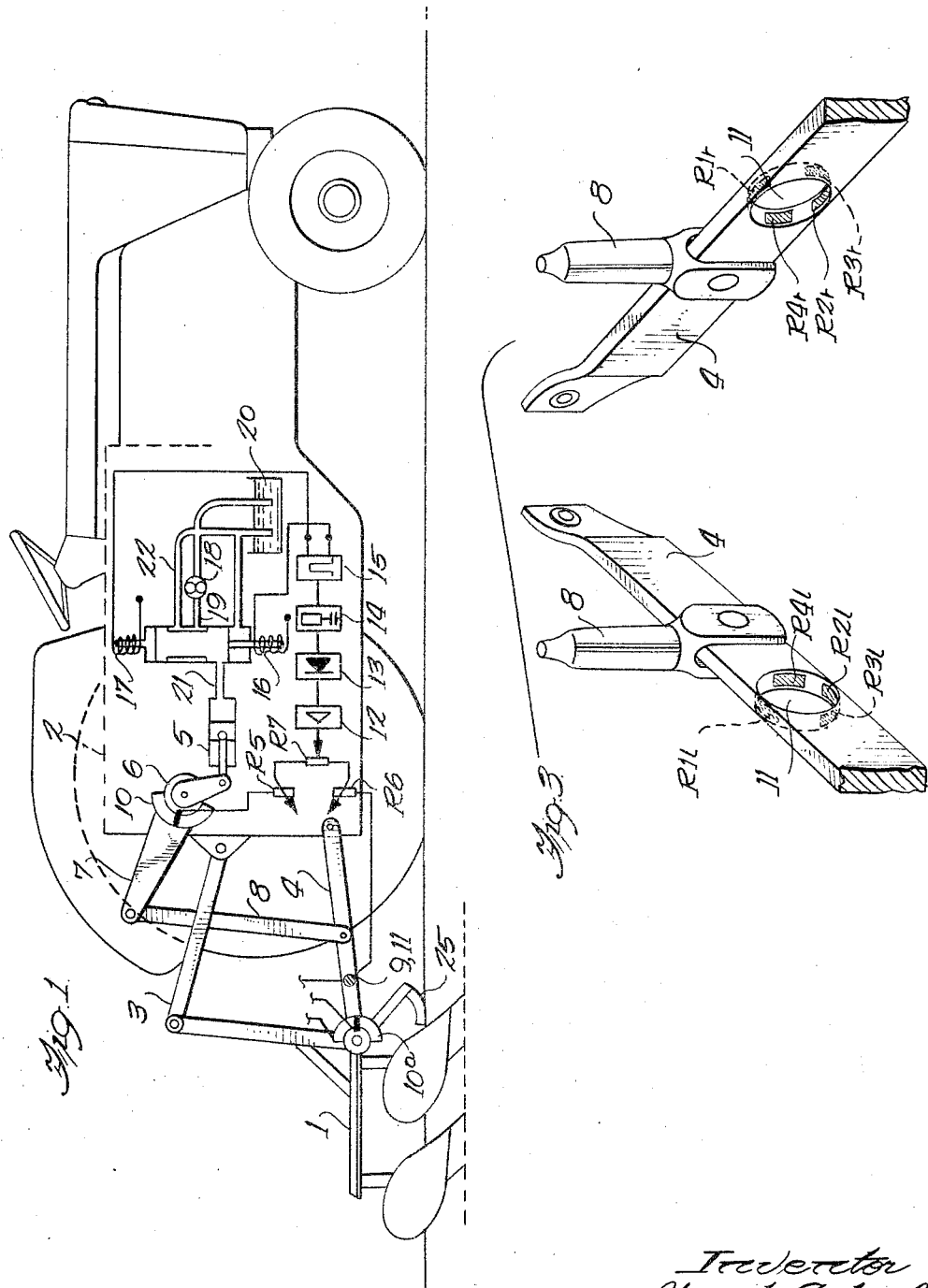
FIG. 1 is a schematic view of a tractor with the electric control of the draft/position control system for a 3-point linkage according to the invention and the associated measuring points.
Figure 2:
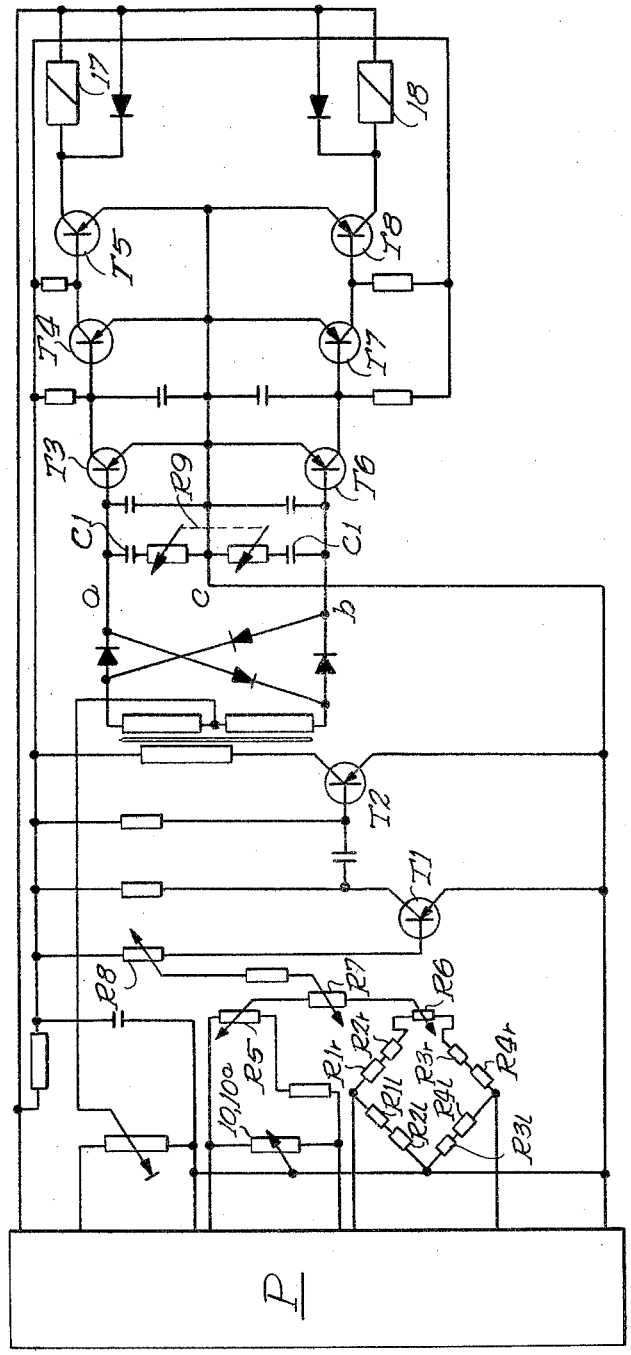
FIG. 2 is a schematic drawing of the control amplifier.

The embodiment provides for a tractor with a hydraulic system for implements mounted to the tractor by a 3-point linkage. As is shown on FIG. 1 the mounted implement 1 is connected with the tractor 2 through this 3-point linkage that consists of one upper link 3 and two lower links 4, a hydraulic operating cylinder 5 effects the lifting of the implement 1 by a rockshaft 6, rocker arms 7 and lifting rods 8 that are connected with the lower links 4.

The draft control starts from the supposition that working depth and draft are proportional. The draft is therefore used as a quantity to be measured in order to determine and readjusts the lifting height of the implement at which a pre-selected draft and thus a pre-selected working depth is maintained.

The embodiment the quantity to be measured "draft" is picked up from strain gages 9 attached to both of the lower links 4, the gages being located in a bore 11 across the longitudinal axis of the lower links, if necessary in a dirt and rainproof manner, as shown on FIG. 3. The four strain gages R1 through R4 are located inside the bore displaced by 90° and lined up in such a way that the variations of resistance double owing to the horizontal tractive forces in the lower links, the variations of resistance, however, compensate each other owning to bending during the lifting process. This is achieved by the strain gages that are located opposite each other in a bore—e.g. R11 and R21 in the left bore—being connected in series and connected as a branch of a Wheatstone bridge.

The quantity to be measured "lifting height," i.e. the relative position of the mounted implement to the tractor is picked up by means of rheostats from parts of the lifting linkage that perform—during lifting and lowering of the implement—a rotary movement that is proportional to the lifting height. Particularly favorable for this is the rockshaft of the 3-point linkage. In case of front lifting the pivot axle—e.g. of a loading shovel—can be used in the same manner. Instead of variable resistors, slide rheostats can be employed, the tapping point of which is connected with a part of the linkage, e.g. the lifting rod, that describes a straight path that is proportional to the lifting height. In case of mounted implements that must maintain a certain working height above the ground gage wheels or feelers are conventionally used. A rheostat can be coupled with the latter, too, in order to effect readjustment to constant ground clearance.

In the embodiment, a rheostat 10 for picking up the lifting height from the rockshaft 6 or a rheostat 10a for picking up the ground clearance from the feeler 25 is optionally provided (FIG. 1). The rheostat 10 or 10a that acts as a voltage divider is supplemented in the outer circuit to a Wheatstone bridge by a balancing potentiometer R5 that is preferably located on the instrument board of the tractor. The bridge of the strain gages 9 is accordingly balanced for picking up the quantity to be measured "draft" by means of the potentiometer R6, i.e. the diagonal voltage of the bridge is adjusted to zero by variation of resistance. The two potentiometers R5 and R6 at the same time serve as theoretical value adjustment when they are provided with a graduation that is calibrated with regard to force and lifting height.

The sliders of the potentiometers R5 and R6 are connected with each other through a high-resistance mixing potentiometer R7. By means of this potentiometer the relation of the bridge currents picked up in the potentiometers R5 and R6 and thus the efficiency of a position or draft control can be changed. The current branching in the potentiometer R7 can be varied to the extent that approximately in center position of the tapping point both bridge currents become effective at an equal strength and thus a mixed control exists and that in either end position of the potentiometer one of the two bridges remains in effective and pure position or draft control is existent.

The mixing potentiometer R7 is followed by a sensitivity governor R8 for the A.C.-amplifier 12 that is provided with two transistors T1 and T2. The sensitivity control equally affects position and draft control; it is adjusted to the individual ratios of tractive power and ground condition.

Through a transformer coupling the amplified A.C.-current is supplied to a phase-critical demodulator 13 that is connected as a bridge rectifier that effects a D.C. flow in the output wires $a$ and $b$ with regard to a common neutral conductor $c$, depending on the direction of deviation from the position and/or draft quantity, preselected with the potentiometers R5 and/or R6.

Basically, the bridges could be excited with constant voltage. The sensitivity governor R8 is in this case followed by a D.C. amplifier.

In the embodiment the conductors $a$ and $b$ are connected behind the phase detector with a time element 14 that is symmetrical with regard to the neutral conductor $c$, the element being followed by a switching circuit 15, that is symmetrical, too. The time element 14 consists of a tandem potentiometer R9 that is connected in series with two condensers C1 and C1', as a symmetrical RC-member. It acts as an attenuator for short sudden increases of load and does not build up a voltage of sufficent height on the condenser unless the loading exceeds a permissible preselectable period. By means of this measure, frequent but harmless interference with rocks, e.g., when plowing, is prevented from causing the hydraulic system to respond.

The switch step 15 that is provided with the transistors T5 and T8 has the task of feeding the solenoid spools that are controlled by the step with a constant voltage surge as long as a voltage is built up on the RC-member 14, that is, above a firmly set threshold value. By using switch transistors, a smooth control according to transistor characteristic is obtained as against a relay and the whole control amplifier is adapted to the rough tractor operation in a shakeproof manner.

The switching circuit controls one of the solenoids in the solenoid spool; the solenoid 16 is current-carrying depending on the deviation of the control quantities from the set-point value and depending on the phase position of the alternating voltage on the rectifier 13. The piston in the solenoid spool directs the oil from the continuous-delivery oil pump 18 to the hydraulic cylinder 5 (lift position), or the solenoid 17 receives a current impulse so that the pressure oil in the control line 19 is connected with the reservoir 20, the hydraulic cylinder is relieved and the oil in it is returned to the reservoir 20 through a restrictor (lowering position).

The solenoid spools are bridged by rectifiers in order to protect the transistors from the induction voltage impulses of the solenoids.

The operation of the control is the following: The balancing potentiometers R5, R6 are adjusted to bridge balance, i.e., the bridge output current is zero. None of the solenoids is actuated, the solenoid spool is in the neutral position, that is, stressed by mutual spring pressure, in which the delivery line 21 from the solenoid spool to the hydraulic cylinder is blocked and the hydraulic cylinder maintains its position under the load of the implement and keeps the implement at its momentary position. At the same time the control line 19 is connected with the delivery line to the oil reservoir through a restrictor.

If the system is to be operated with position control, the bridge connected with the variable resistor 10 or 10a is adjusted to the desired set-point value by means of balancing potentiometer R5 and the mixing potentiometer R7 is turned to full efficiency of the potentiometer R5. One of the solenoids 16 or 17 is then supplied with a current until the implement has lifted or lowered to the desired height.

When lifting, the piston of the hydraulic cylinder 5 is acted upon by pressurized oil from the control line 19 through line 21. The control line 19 on the pressure side of the pump is connected with the return line 22 to the reservoir 20 by means of a pressure relief value in such a way that the full oil pressure is available for the lifting process.

When lowering the implement the control spool piston is moved by one of the solenoids 17 in such a way that the pressure line 21 is connected with the oil return line through a restrictor that is not shown on the drawing and the control line 19 is also connected with the oil return line.

In case of draft control the potentiometer R6 is moved into the position that corresponds to the desired working depth. The strain gage bridge then carries current and the hydraulic ram is actuated until the desired draft is reached after which the bridge is in balanced condition again. During this control process the mixing potentiometer R7 is turned to the opposite stop as in case of position contorl for full efficiency of potentiometer R6. Every change of the draft always causes a change of the balance in the bridge of the strain gages 9. This change unbalances the bridge so that the working depth is readjusted automatically.

Power for the entire system is provided by power supply P, which is conventional in all respects and forms no part of the present invention.

What is claimed is:

1. In a position and draft control system, a draft link, hydraulic power means associated with said link for raising and lowering said link, draft resistance means including strain gauge means connected with said link for establishing a control pulse which is variable in accordance with variation in the strain imposed upon said link as a result of variation in draft, means associated with said draft resistance means for detecting the phase of and amplifying said pulse, and means associated with said detecting and amplifying means and responsive to said pulse for actuating said hydraulic power means so as to selectively raise and lower said link in order to compensate for said variation in draft.

2. The invention according to claim 1, said detecting and amplifying means including means for delaying the response of said actuating means.

3. The invention according to claim 1, further including position resistance means associated with said link for establishing a control pulse which is variable in response to variation in the position of said link, and potentiometer means connecting said strain gauge means and said position resistance means with said detecting and amplifying means, said potentiometer means being of such high resistance that pulses from said strain gauge means or said position resistance means may be selectively disconnected from said detecting and amplifying means.

4. The invention according to claim 1, said strain gauge means including four strain gauges oriented perpendicular to the longitudinal axis of said link and displaced from each other by ninety degrees, opposite pairs of said strain gauges being connected in series in opposite branches of a Wheatstone bridge.

References Cited by the Examiner

UNITED STATES PATENTS

| | | | |
|---|---|---|---|
| 2,520,923 | 9/1950 | Franzel et al. | 73—141 |
| 2,576,417 | 11/1951 | Ruge | 73—141 |
| 2,755,721 | 7/1956 | Rusconi | 122—4 |
| 3,029,715 | 4/1962 | Bowen. | |
| 3,064,371 | 11/1962 | Kuizler | 172—2 XR |

FOREIGN PATENTS

| | | |
|---|---|---|
| 510,443 | 9/1920 | France. |
| 576,105 | 4/1958 | Italy. |

OTHER REFERENCES

Electric Controls and Actuators by Harold A. Cloud, Agricultural Engineering, September 1963, vol. 44, No. 9, pages 484–485.

ABRAHAM G. STONE, *Primary Examiner.*

FRANCIS B. HENRY, *Assistant Examiner.*